United States Patent Office 3,159,155
Patented Dec. 1, 1964

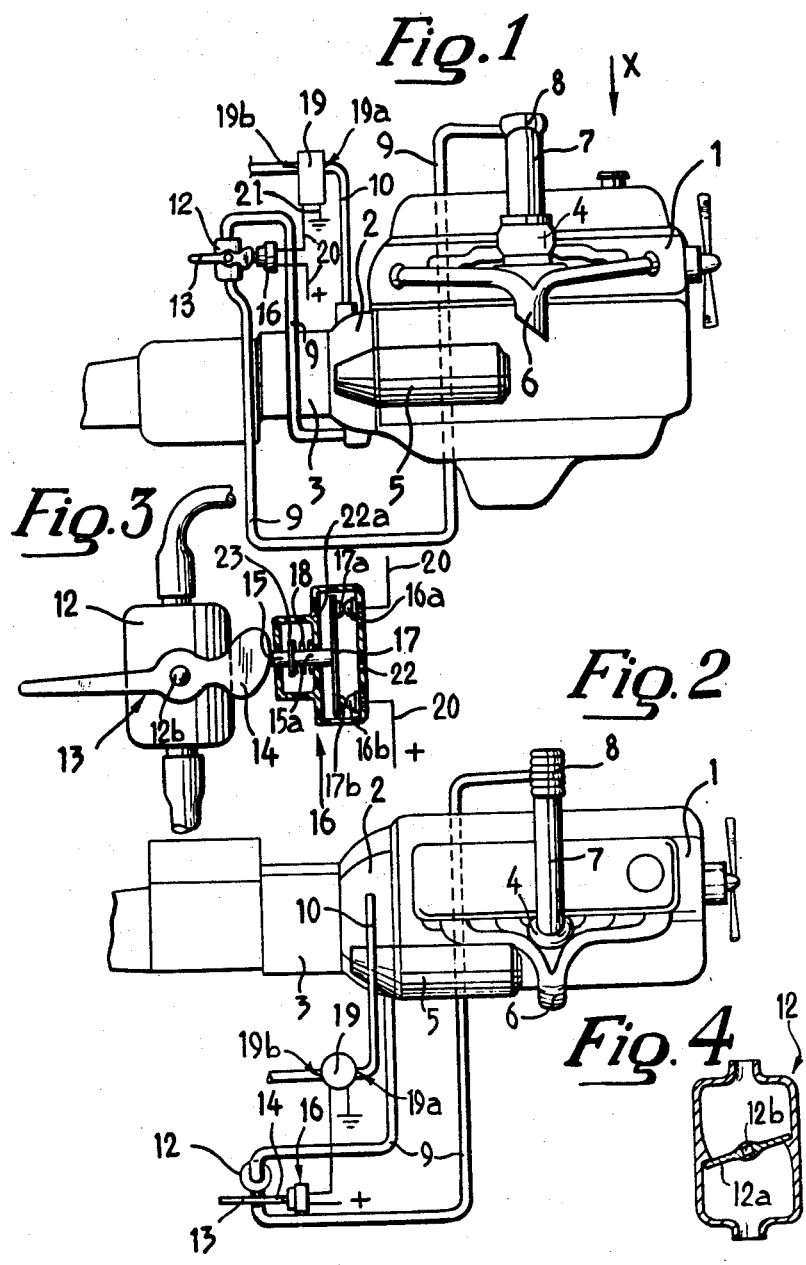

3,159,155
SEAL FOR THE FRICTION CLUTCH AND STARTER
CASINGS FOR AMPHIBIOUS VEHICLES
Secondo Pogliano, Turin, Italy, assignor to
Fiat Societa per Azioni, Turin, Italy
Filed Feb. 11, 1963, Ser. No. 257,462
Claims priority, application Italy, Feb. 16, 1962,
3,471/62
3 Claims. (Cl. 123—198)

This invention relates to amphibious motor vehicles such as military and general purpose vehicles.

In known amphibious vehicles water is apt to enter the friction clutch casing which is attached to the bottom portion of the vehicle engine as well as the casing of the electric starter connected to the friction clutch casing.

This leads to damage of the electric insulation of the starter and cause slipping of the friction surfaces of the friction clutch.

A main object of this invention is to provide a device for use on motor vehicles for preventing access of water to the friction clutch and starter casings.

A further object of this invention is to provide a device of the type mentioned above which on drive of the vehicle on land, effects internal ventilation of the friction clutch casing in order to remove oil vapors and moisture therefrom.

With the above objects in view this invention provides a device for use on motor vehicles, adapted to prevent access of water to the friction clutch and starter casings comprising a piping connecting the inside of the suction manifold of the propelling engine with the inside of the friction clutch casing, a pneumatic valve interposed in the said piping, the valve member of which has two end positions for closing and opening the valve, respectively, a control for said valve adapted to move the valve member to either end position, an electric compressor the delivery opening of which connects with the inside of the friction clutch casing and the suction opening of which connects with the outside, and an electric switch in the feed circuit for the electro compressor, governed by the pneumatic valve, movement of the valve control for moving the valve member to the closed valve position, effecting closure of the switch, and movement of the valve control for moving the valve member to the open valve position opening the switch.

Further characteristic features and advantages of this invention will be understood from the appended detailed description referring to the accompanying drawings given by way of an example, wherein:

FIG. 1 is a diagrammatical side view of an engine and gearbox unit for a motor vehicle provided with the improved device;

FIG. 2 is a view in the direction of the arrow X in FIG. 1;

FIG. 3 is a part sectional enlarged detail view of FIG. 1 showing the pneumatic valve and electric switch unit;

FIG. 4 is an axial sectional view of the pneumatic valve.

A propelling engine 1 for a motor vehicle is equipped with its conventionally associated components, such as a suction manifold 7 having an air cleaner 8, a carburetor 4, exhaust manifold 6 and an encased starter 5.

The engine 1 has associated therewith in a conventional manner a friction clutch casing 2 followed by a gearbox 3.

A piping 9 extends between the air cleaner 8 and friction clutch casing 2 and connects through the air cleaner 8 the inside of the suction manifold 7 with the inside of the friction clutch casing 2.

The casing of the electric motor of the starter 5 connects in a known manner with the inside of the friction clutch casing 2 through an opening, not visible in the figures, through which a pinion of the electric starter 5 extends to mesh with the flywheel rim on the engine 1.

A centrifugal electrically driven compressor 19 has a delivery opening 19a connected with the inside of the friction clutch casing 2 by a delivery conduit 10.

The compressor 19 is arranged on the motor vehicle above the water line of the vehicle on water.

A suction opening 19b of the compressor 19 connects with the outside atmosphere.

A valve 12 is interposed in the piping 9, and has a valve member 12a having two positions for opening and closing the valve 12, respectively.

The valve 12 comprises, a valve member preferably a throttle 12a keyed to a shaft 12b effecting opening and closing of the valve.

The valve 12 is provided with an external control member in the form of a lever 13 keyed to the shaft 12b.

A normally open push button switch 16, is connected in the electric circuit diagrammatically shown in FIGS. 1 and 2 by the wires 20, 21 feeding the compressor 19.

The wire 20 connects one terminal of the compressor 19 to the positive pole of a storage battery, diagrammatically denoted by + in FIGS. 1 and 2, the wire 21 connecting the other terminal of the compressor 19 to the earth.

As shown in FIG. 3 the switch 16 comprises a body 22 of insulating material, having secured therein two mutually electrically insulated stationary contacts 16a, 16b.

A movable equipment is arranged within the switch body 22 and comprises a conductive armature 17, the ends of which carry contacts 17a, 17b arranged opposite the stationary contacts 16a, 16b, respectively.

A rod 15a is transversely attached by one end to the middle of the armature 17 and extends from the body 22 by its other end which is provided with a push button 15 of insulating material, slidable in a bore in the box 22.

A helical spring 18 coiled around the rod 15a is compressed between an abutment 22a on the box 22 and a screw threaded collar 23 secured to the rod 15a and tends to maintain the armature 17 with its contacts 17a, 17b removed from the stationary contacts 16a, 16b.

The wire 20 is interrupted at a suitable point, where its two ends are welded to the stationary contacts 16a, 16b, respectively.

The lever 13 is provided with a cam 14 acting on the push button 15, the profile of which is such that, when the lever 13 is in the position in which the throttle 12a closes the valve 12, the cam 14 presses the push button 15 and draws the contacts 17a, 17b towards the contacts 16a, 16b.

In this manner the electric feed circuit for the compressor 19 is closed, and the compressor 19 is started.

When the lever 13 is in the position in which the throttle 12a opens the valve 12, the profile of the cam 14 is drawn away from the push button 15, the armature 17 receding under the action of spring 18 and removing the contacts 17a, 17b from the stationary contacts 16a, 16b, whereby the electric circuit for the compressor 19 is opened.

During road drive the lever 13 is placed by the driver in the latter position, so that the compressor 19 is inoperative and valve 12 is open.

Suction effected by the propelling engine 1 sets up through piping 9 a sub-atmospheric pressure in the friction clutch casing 2, whereby an air stream admitted through the suction opening 19b passes through the compressor 19, conduit 10, friction clutch casing 2 and piping 9 and is discharged through the air cleaner 8 into the suction manifold 7.

While passing through the friction clutch casing 2 the air flow carries along oil vapors and moisture which may be present therein.

The air stream is not intercepted by the compressor 19 since the latter is of a centrifugal type and air freely passes between its blades.

Before the vehicle is driven into water the driver operates the lever 13 to close the valve 12, whereby interconnection of the friction clutch casing 2 and suction manifold 7 is intercepted.

The cam 14 then presses the push button 5 and closes the supply circuit to start the compressor 19.

The compressor 19 draws air from the opening 19b and forces it into the friction clutch casing 2, hence through the aperture in said casing into the starter in said casing 5.

The air pressure within the friction clutch casing 2 and starter casing 5 prevents water to enter therein through imperfect seals or other apertures.

Upon completion of driving on water the driver operates the lever 13 and restores the valve 12, hence the switch 16 to their initial condition, re-establishing normal operation of the device.

What I claim is:

1. Device for amphibious motor vehicles propelled by an engine having an induction manifold, a friction clutch casing and a starter casing for preventing water access to the friction clutch and starter casings during driving in water comprising a piping interconnecting the inside of the suction manifold of the engine with the inside of the friction clutch casing, a valve interposed in said piping, the valve member of which has two extreme positions for opening and closing the valve, respectively, a control member for the valve for moving manually the valve member of the valve to either extreme position, an electrically driven compressor having the delivery opening connected with the inside of the friction clutch casing, and having the suction opening connected with the outside atmosphere, and an electric switch in the supply circuit for the compressor, governed by the control member of the valve, to close the compressor circuit simultaneously with the closure of the valve, and to open said circuit simultaneously with the opening of said valve.

2. Device as claimed in claim 1, wherein the compressor is of a centrifugal type.

3. Device as claimed in claim 1, wherein the valve and switch are operatively interconnected said valve comprising a valve body, a throttle within said body a shaft for the throttle extending outside of said body, a lever keyed to said shaft outside of the valve body, a cam on one end of said lever said switch having fixed contacts carrying body, a mobile contact carrying armature within said body a push rod fixed to said armature and spring means on said push rod to keep the switch contacts open, said push rod operatively contacting the cam on the valve lever, whereby upon the closure of the valve, the cam pushes the rod against the action of said spring means to close the switch contacts.

References Cited in the file of this patent
UNITED STATES PATENTS

| | | |
|---|---|---|
| 2,429,732 | Roos | Oct. 28, 1947 |
| 2,650,577 | Bales | Sept. 1, 1953 |
| 2,782,773 | Stone | Feb. 26, 1957 |